United States Patent
Zhu

(10) Patent No.: US 10,216,232 B1
(45) Date of Patent: Feb. 26, 2019

(54) TABLET NOTEBOOK FLIP DEVICE

(71) Applicant: Dongguan Bluefinger Electronics Co., Limited, Dongguan (CN)

(72) Inventor: Dajun Zhu, Dongguan (CN)

(73) Assignee: Dongguan Bluefinger Electronics Co., Limited, Dongguan (CN)

(*) Notice: Subject to any disclaimer, the term of this patent is extended or adjusted under 35 U.S.C. 154(b) by 0 days.

(21) Appl. No.: 15/897,199

(22) Filed: Feb. 15, 2018

(30) Foreign Application Priority Data

Feb. 2, 2018 (CN) .......................... 2018 1 0108585

(51) Int. Cl.
| | |
|---|---|
| *E05D 3/06* | (2006.01) |
| *E05D 7/00* | (2006.01) |
| *E05D 9/00* | (2006.01) |
| *G06F 1/16* | (2006.01) |

(52) U.S. Cl.
CPC ............. *G06F 1/1681* (2013.01); *E05D 3/06* (2013.01); *E05D 7/00* (2013.01); *E05D 9/00* (2013.01); *G06F 1/1656* (2013.01); *E05Y 2900/606* (2013.01); *G06F 1/1616* (2013.01); *G06F 1/1662* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,025,274 | B2* | 4/2006 | Solomon | G06F 1/1669 |
| | | | | 235/472.01 |
| 8,665,589 | B2* | 3/2014 | Lin | G06F 3/0202 |
| | | | | 361/679.41 |
| 9,304,546 | B2* | 4/2016 | Huang | G06F 1/1654 |
| 9,310,848 | B2* | 4/2016 | Fujino | G06F 1/1654 |
| 9,910,455 | B1* | 3/2018 | Morrison | H01F 7/0252 |
| 9,952,628 | B2* | 4/2018 | Lee | G06F 1/1654 |
| 9,971,385 | B2* | 5/2018 | Mori | G06F 1/16 |
| 10,025,353 | B2* | 7/2018 | Iwamoto | E05B 73/0082 |
| 10,061,355 | B2* | 8/2018 | Iwamoto | G06F 1/1632 |
| 2018/0046218 | A1* | 2/2018 | Iwamoto | E05B 73/0082 |
| 2018/0046222 | A1* | 2/2018 | Iwamoto | G06F 1/1616 |

* cited by examiner

*Primary Examiner* — Lisa Lea-Edmonds
(74) *Attorney, Agent, or Firm* — Karthik Murthy; Murthy Patent Law PLLC

(57) ABSTRACT

This paper discloses a tablet notebook flip device comprising a base portion for main body, biaxial shafts, a mounting connector and an upper axis. The main body is arranged above the base portion for the main body, having a keyboard above. A tablet cover is configured on a holder. A clamp plate with a mounting connector below is on a side of the biaxial shafts. A support flap with main body of the shaft on a side is configured below the mounting connector. A lower axis and the upper axis are configured within the main body of the shaft. The benefit: the tablet notebook acts as a notebook computer when the keyboard is adopted for data input, and functions independently as a tablet computer when the flip device is turned around in a 360° rotation becoming a protective case or is turned to a reversal angle to form an A-shape for another type of user experience.

8 Claims, 3 Drawing Sheets

TABLET NOTEBOOK FLIP DEVICE

FIELD OF THE INVENTION

The invention relates to the field of notebook computers, more particularly to a type of tablet notebook flip device.

BACKGROUND OF THE INVENTION

A tablet computer is thin and portable, providing a natural interaction, yet the lack of stability and efficiency in data entry limits its usage primarily to leisure and recreation time. For this reason, a tablet computer with a peripheral keyboard is introduced, better in performance but poorer in portability and user experience. The adoption of full-size keyboards and plural extended ports allows the tablet to function more like a notebook computer, which is a great need and brings changes to tablets, eventually evolving to a tablet notebook. In the PC era, personal computing terminals have changed from traditional personal computers to tablet computers, smart phones, and the like. Notebook computers and tablet computers are the most significant personal computing terminals becoming more and more important in information production and consumption, and would evolve along with different needs in user experience.

The present tablet notebook can be adjusted to different angles only by a panel set backwards when in use, which is not stable and slow in typing because it needs tapping a touch screen display for data input.

SUMMARY

This application is intended to introduce a tablet notebook flip device to solve the problem mentioned above. A technical proposal is presented as follows:

The tablet notebook flip device comprises a base portion for main body, biaxial shafts, a mounting connector, and an upper axis. The main body is arranged above the base portion for the main body, having a keyboard above and the biaxial shafts on a side. Configured above the biaxial shafts is a holder holding a tablet cover, and on the side of the biaxial shafts is a clamp plate with a mounting connector below. A support flap with main body of the shaft on a side is configured below the mounting connector. A lower axis and the upper axis are configured within the main body of the shaft.

In the structure described above, the base portion for main body is connected to the main body to protect the bottom side of the main body. Data input to the tablet notebook is facilitated using the keyboard. The biaxial shafts enable the upper and lower parts of the tablet notebook function separately. The lower axis is coupled to the main body for angle adjusting, the upper axis coupled to the holder for angle adjusting. The tablet cover protects the inner components of the tablet notebook from possible harm due to excessive vibration. The clamp plate is connected to the main body and the holder, fixed by the mounting connector and supported by the support flap.

For better performance of the tablet notebook flip device, the base portion for main body is connected to the main body with bolts, the keyboard connected to the main body with nesting, and the main body connected to the clamp plate with bolts.

For better performance of the tablet notebook flip device, the holder holds the tablet cover and is connected to the clamp plate with bolts.

For better performance of the tablet notebook flip device, the clamp plate is connected to the mounting connector with bolts and is soldered to the support flap.

For better performance of the tablet notebook flip device, the main body of the shaft is connected to the support flap with bolts.

For better performance of the tablet notebook flip device, the lower axis is coupled to the main body, the upper axis to the holder.

For better performance of the tablet notebook flip device, there are two clamp plates made of aluminum alloy, each 5 cm long, with space of 20 cm between each other.

For better performance of the tablet notebook flip device, the holder is made of wear-resistant PVC, the top edge in an arc shape of 30°.

The benefit of this application: the tablet notebook acts as a notebook computer when the keyboard is adopted for data input, and functions independently as a tablet computer when the flip device is turned around in a 360° rotation becoming a protective case or is turned to a reversal angle to form an A-shape for another type of user experience.

BRIEF DESCRIPTION OF THE DRAWINGS

The technical solutions in the embodiments of the present application will be described clearly and completely hereinafter in conjunction with the accompanying drawings in the embodiments of the present application. Apparently, the following drawings are only a part of the embodiments of the present application, rather than all embodiments. A person skilled in the art may achieve other drawings based on the following ones without any creative efforts.

DESCRIPTION OF THE DRAWINGS AS FOLLOWS 1. a base portion for main body, 2. a keyboard, 3. a main body, 4. biaxial shafts, 5. a holder, 6. a tablet cover, 7. a clamp plate, 8. a mounting connector, 9. a support flap, 10. a main body of shaft, 11. a lower axis, 12. an upper axis

DETAILED DESCRIPTION OF THE INVENTION

Figure 1:
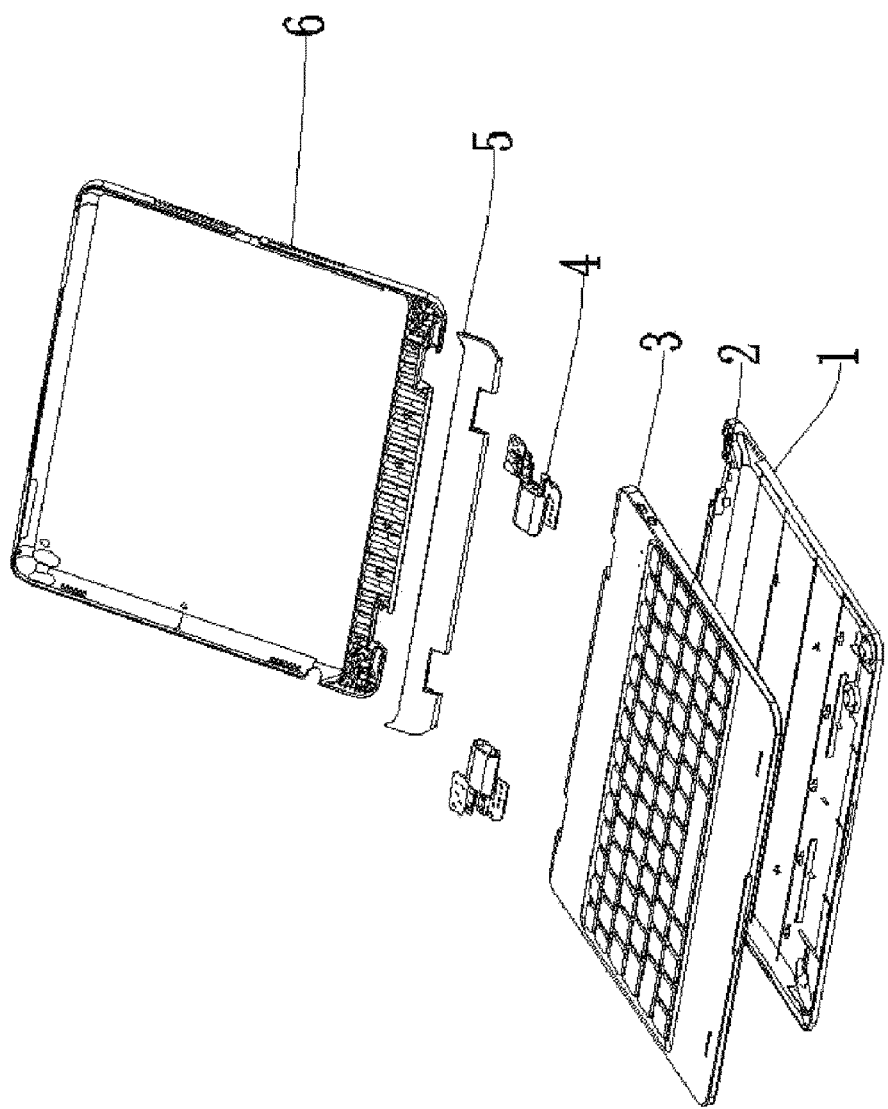
FIG. 1 shows the installation of the tablet notebook flip device.
Figure 2:
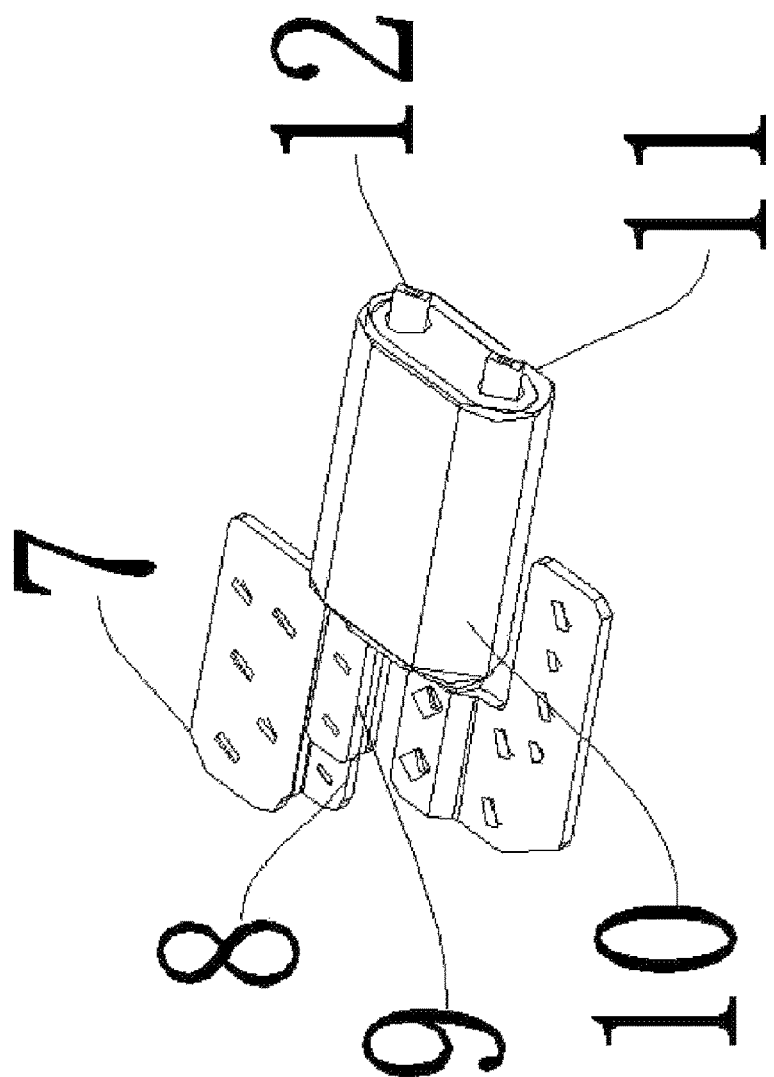
FIG. 2 shows the biaxial shafts of the tablet notebook flip device.
Figure 3:
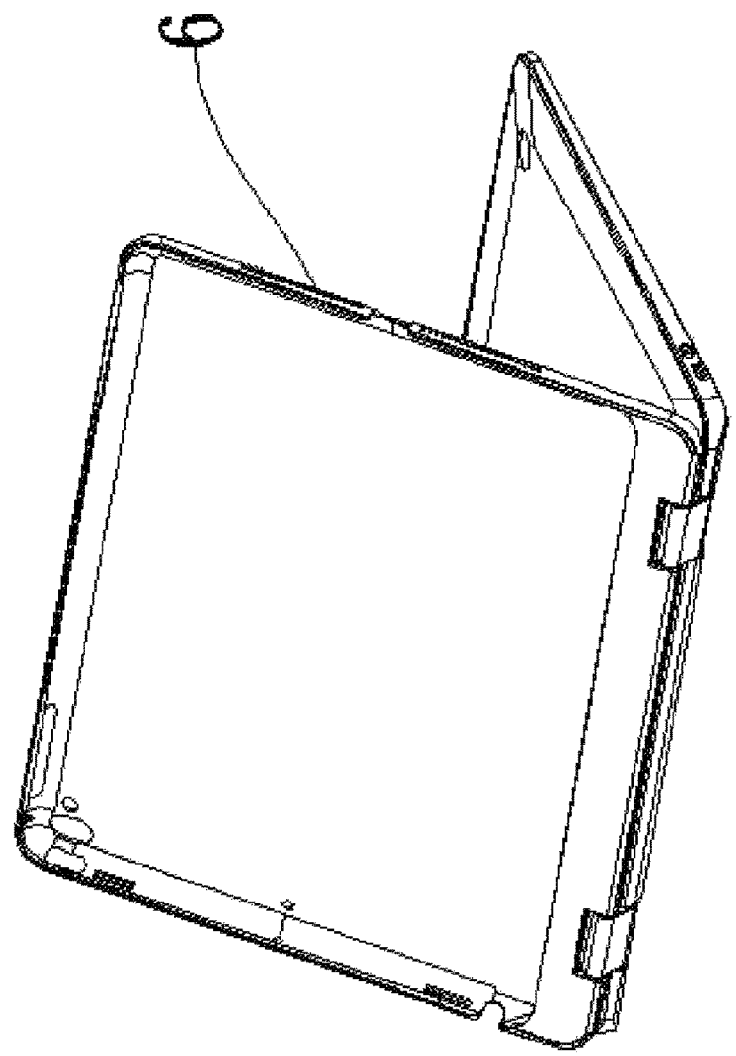
FIG. 3 shows a reversal image of the tablet notebook flip device.

Further description related to this application would be completed with the drawings:

As shown in FIGS. 1-3, the tablet notebook flip device comprises the base portion for main body 1, biaxial shafts 4, the mounting connector 8, and the upper axis 12. The main body 3 is arranged above the base portion for the main body 1, having the keyboard 2 above and the biaxial shafts 4 on a side. Configured above the biaxial shafts 4 is the holder 5 holding the tablet cover 6, and on the side of the biaxial shafts is the clamp plate 7 with the mounting connector 8 below. The support flap 9 with main body of the shaft 10 on its side is configured below the mounting connector 8. The lower axis 11 and the upper axis 12 are configured within the main body of the shaft 10.

In the structure described above, the base portion for main body 1 is connected to the main body 3 to protect the bottom side of the main body 3. Data input to the tablet computer is facilitated using the keyboard 2. The biaxial shafts 4 enable the upper and lower parts of the tablet notebook function separately. The lower axis 11 is coupled to the main body 3 for angle adjusting, the upper axis 12 coupled to the holder 5 for angle adjusting. The tablet cover 6 protects the inner components of the tablet notebook from possible harm due to excessive vibration. The clamp plate 7 is connected to the main body 3 and the holder 5, fixed by the mounting connector 8 and supported by the support flap 9.

For better performance of the tablet notebook flip device, the base portion for main body 1 is connected to the main body 3 with bolts, the keyboard 2 connected to the main body 3 with nesting, the main body 3 connected to the clamp plate 7 with bolts. The holder 5 holds the tablet cover 6 and is connected to the clamp plate 7 with bolts. The clamp plate 7 is connected to the mounting connector 8 with bolts and soldered to the support flap 9. The main body of the shaft 10 is connected to the support flap 9 with bolts, the lower axis 11 coupled to the main body 3, the upper axis 12 to the holder 5. The two clamp plates 7 are made of aluminum alloy, each 5 cm long, with space of 20 cm between each other, the holder 5 made of wear-resistant PVC, the top edge in an arc shape of 30°.

The above illustration and description provide basic principles, primary features and advantages related to this application. Technical personnel in this field should know that the above embodiments impose no restrictions on this application. The described embodiments and descriptions are intended to illustrate the principles related to this application, various changes, modifications and equivalents may be made without departing from the spirit and scope of the application and would fall into the scope of the present application.

The invention claimed is:

1. A tablet notebook flip device comprises a base portion for a main body, biaxial shafts, a mounting connector, and an upper axis;

wherein the previously mentioned main body is arranged above the base portion for the previously mentioned main body, having a keyboard above and the biaxial shafts on a side;

wherein configured above the biaxial shafts is a holder holding a tablet cover, and on the side of the biaxial shafts is a clamp plate with the previously mentioned mounting connector below;

wherein a support flap with a main body of the shaft on a side is configured below the mounting connector;

wherein a lower axis and the upper axis are configured within the main body of the shaft.

2. The tablet notebook flip device of claim 1 wherein the base portion for main body is connected to the main body with bolts, the keyboard connected to the main body with nesting, and the main body connected to the clamp plate with bolts.

3. The tablet notebook flip device of claim 1 wherein the holder holds the tablet cover and is connected to the clamp plate with bolts.

4. The tablet notebook flip device of claim 1 wherein the clamp plate is connected to the mounting connector with blots and is soldered to the support flap.

5. The tablet notebook flip device of claim 1 wherein the main body of the shaft is connected to the support flap with bolts.

6. The tablet notebook flip device of claim 1 wherein the lower axis is coupled to the main body, the upper axis to the holder.

7. The tablet notebook flip device of claim 1 wherein there are two clamp plates made of aluminum alloy, each 5 cm long, with space of 20 cm between each other.

8. The tablet notebook flip device of claim 1 wherein the holder made of wear-resistant PVC, the top edge in an arc shape of 30°.

\* \* \* \* \*